X. CAVERNO.
MOUNTING FOR PRIVATE UTILITIES.
APPLICATION FILED JUNE 26, 1914.
1,204,544.
Patented Nov. 14, 1916.
2 SHEETS—SHEET 2.
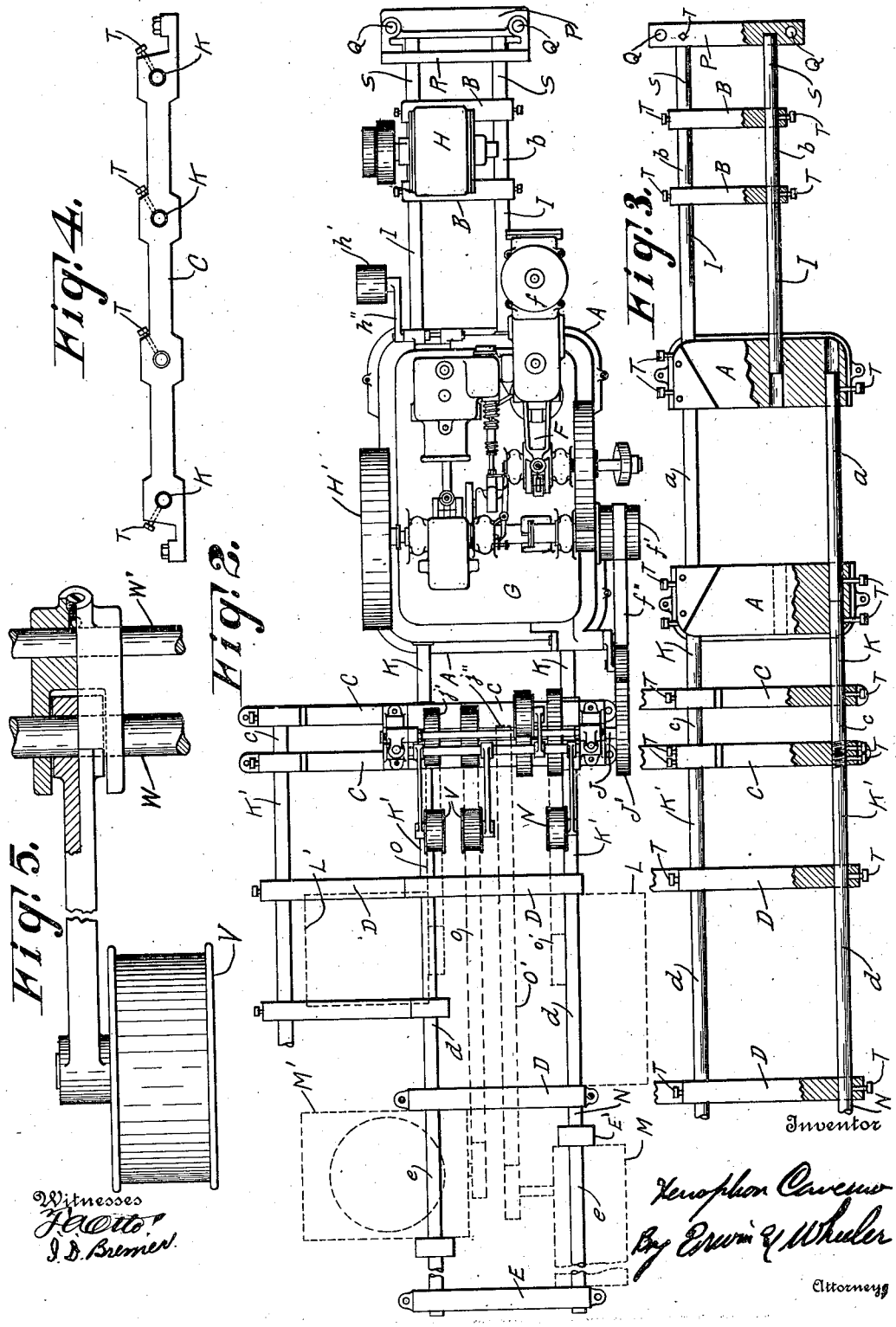

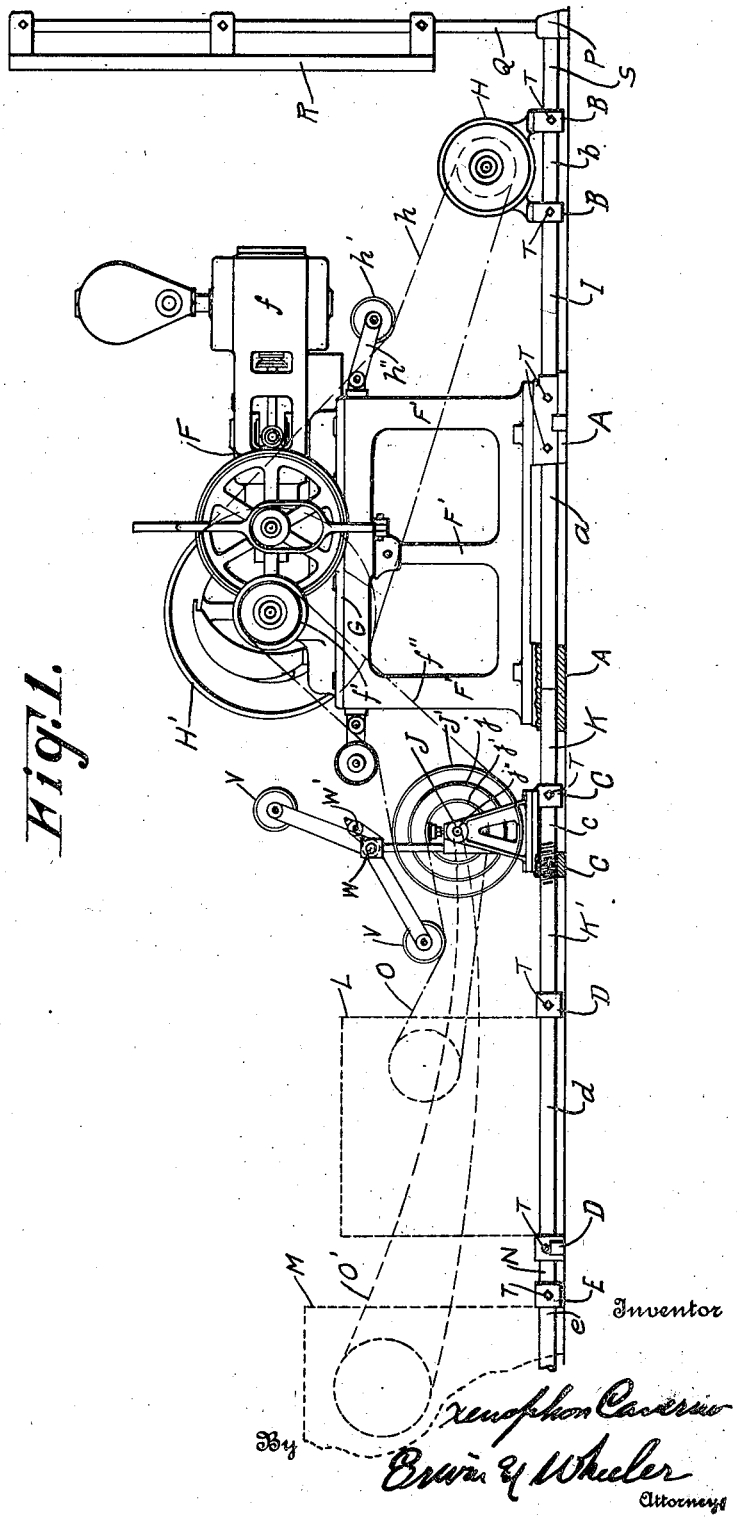

UNITED STATES PATENT OFFICE.

XENOPHON CAVERNO, OF KEWANEE, ILLINOIS.

MOUNTING FOR PRIVATE UTILITIES.

1,204,544.

Specification of Letters Patent.

Patented Nov. 14, 1916.

Application filed June 26, 1914. Serial No. 847,407.

*To all whom it may concern:*

Be it known that I. XENOPHON CAVERNO, a citizen of the United States, residing at Kewanee, county of Henry and State of Illinois, have invented new and useful Improvements in Mountings for Private Utilities, of which the following is a specification.

The object of my invention is to provide means, whereby a set or series of private utility mechanisms, such as are usually driven from a single motor, gasolene or electric, may be assembled together by inexperienced persons in a properly spaced relation to each other and to the motor, and connected up for operation without requiring the service of an installing expert, and without requiring material changes or readjustments of either the power transmitting members or of connecting frame members.

With the above object in view, I have designed spacing and supporting means composed of a series of units, each rigid in itself, but connected with others to form a sub-base or mounting having sufficient flexibility to allow the required degree of adaptation incident to the installation of small and inexpensive power plants for private or domestic use.

In the drawings, Figure 1 is a side elevation of a set of private utilities assembled in operative relation to each other and supported upon a mounting embodying my invention. Fig. 2 is a plan view of the same. Fig. 3 is a plan view of the mounting as it appears when stripped of the supporting mechanisms, the several units being assembled in position to receive such mechanisms. Fig. 4 is a front elevation of one of the base castings. Fig. 5 is a plan view of an idler pulley and positioning member both being partially cut away to a plane exposing the supporting shafts.

Like parts are identified by the same reference characters throughout the several views.

In connecting up the larger types of driving and driven machines, such for example as a prime mover, (gasolene, steam or electric), and a driven machine, such as a pump or an electric motor, it has heretofore been customary to use a rigid base, which is accurately machined and upon which the different parts are mounted. But in extending a set of different driven machines longitudinally from the prime mover, a rigid base is out of the question, except with very expensive and heavy machinery. In small plants, such as are used for private and domestic purposes, and particularly by farmers where it is desirable to employ a single internal combustion motor in clutch connection with an electric generator, and also with pumps, feed cutters, corn shellers, churns, vacuum cleaners, etc., any one of which machines may be driven from the same actuating motor, it is very desirable that means be provided whereby supporting units made at the shop or factory, may be shipped with the machines and used not only to support the several individual machines, but also to space them in their proper relation to each other, so that the power transmitting rods, chains, or belting may all be shipped ready for use, and connected up without alteration as soon as the machines have been installed upon the respective supporting units. To accomplish these results, I employ a set of bed units, such as the bed units A, B, C, D and E, illustrated in the drawings. These units preferably comprise pairs of castings connected by pairs of spacing rods $a, a, b, b, c, c, d, d,$ and $e, e$, which spacing rods may be conveniently formed of tubing threaded at each end and slipped or screwed into the respective castings. Each pair of castings and its respective spacing rods constitute a single unit adapted to support an individual machine or machine frame. For example, in the structure as illustrated in the drawings, the castings A, A, constitute the supporting unit for the actuating motor F, the latter being mounted upon a frame F', which supports a table G, or bed proper, upon which the motor is directly supported. A pump $f$ may also be supported from the table or bed G. The rods $a, a$, are adapted to hold the base castings A, A, in proper spaced relation to each other, so that when the motor supporting frame F' is mounted thereon, the bolt holes therein will register with those in the base castings A. It is not material to my invention whether the castings A are connected with each other by rods $a$, preparatory to shipment to the point of installation, or whether these castings are separately shipped and connected up by the rods $a, a$, at the point of use, since in either case the rods *a, a*, determine the distance of the castings A, A, from each other, said rods being shouldered or suitably marked to indicate the proper spacing.

The base castings B, B, and spacing rods *b*, comprise the supporting unit for an electric generator H. This is driven from a pulley H' on the motor by means of a belt *h*, and a belt tightener pulley *h'* is preferably employed, this being supported by an arm *h''* from the motor supporting frame F'. Spacing rods I connect one of the castings B with one of the castings A of the motor supporting unit, and these rods I determine the proper distance at which the motor supporting unit is to be placed.

The castings C, C, comprise a supporting unit for a jack shaft J, provided with a driving pulley J' and driven pulleys *j, j'*, and *j''*. The driving pulley J' may be actuated from the motor pulley *f'* through a belt *f''*, and spacing rods K, K, connect the jack shaft bed unit C, C, *c*, with the motor supporting unit A, A, *a*.

Any desired number of machines may be driven from the jack shaft J. In the drawings, I have conventionally illustrated the casings of four such machines. The casing L is mounted upon the unit D, D, *d*, and the casing M is mounted upon the unit E, E, *e*. Similarly casing L' is mounted upon unit D', D', *d'*, and the casing M' is mounted upon the unit E', E', *e'*. For the purposes of this description, the casing L may be assumed to contain a vacuum cleaner, the casing M may be assumed to contain a washing machine, the casing L' a churn, and the casing M' a cream separator. These casings, however, are intended to illustrate conventionally any form of driven machine suitable to be connected up with an ordinary internal combustion engine of the type in common use for private purposes. These machines are suitably spaced from each other by connecting rods N, which unite the units D, D, *d* and E, E, *e*, etc. Belts O, O', *o, o'* are employed to drive these respective machines from the countershaft J. Idler pulleys are provided where necessary for the purpose of tightening these belts. They are pivotally supported from shaft W above the jack shaft and press upon the belts with their own weight. Positioning members carried by shaft W' serve to permit of easy longitudinal adjustment of said pulleys along shaft W.

It is not necessary that each supporting base unit should comprise a pair of castings connected in spaced relation by a pair of spacing rods. At the right hand in Fig. 1, I have illustrated a unit composed of a single base casting P, which supports suitable standards Q, which carry a switch board R. The base casting P is properly spaced from the generator base unit B, B, *b*, by spacing rods S. For the larger or heavier machines, however, I prefer to form the base unit of a pair of castings connected with each other by spacing rods.

The spacing rods, including those which connect the castings of any given unit and also those which connect the units with each other, preferably consist of metal tubing, which is light and easily handled. It is not essential to my invention whether this tubing is all formed in separable sections each independently connected with a pair of castings, or whether several lineally alined connecting members or tubing sections are formed in a single integral tube, upon which the castings may be slipped longitudinally to their proper position and clamped. By employing belts for transmitting motion from one machine to another, together with suitable belt tighteners for taking up the slack, it is possible to either cut the tubing into spacing sections, or to mark it in sections so that all of the machine units will be spaced in exactly the same relation to each other at the point of use that they would occupy if assembled at the shop, preparatory to shipment. Where the series of connected mechanisms is not too long and the number of such mechanisms is definitely known, I prefer to employ a single set of spacing rods upon which the base castings may be slipped and secured by set screws T, said castings being provided with holes through which said rods may pass. By employing base castings adapted to be used separately or in groups to form the above described base units and connecting them by metal tubing, as above described, a continuous bed of any desired length may be provided without requiring an absolutely level surface for the foundation upon which such bed is placed. The units will have sufficient flexibility in themselves and in their connection with each other to allow self adjustment, whereby the units may adapt themselves to ordinary floor surfaces.

The belt tightener pulleys *h', h'', h$^8$*, etc., may be flanged as shown, whereby exact alinements become unnecessary since these idle belt tightener pulleys may be utilized to properly aline the belt with the pulley of the driven machine.

The units may also be laterally offset from each other, since the base castings, or some of them at least, will have more than two holes through which the connecting tubing may extend, and such castings may extend transversely to any desired distance from the line of the base frame upon which the driving motor, or engine, is mounted. In Fig. 4 one of the castings C of the countershaft unit is illustrated as provided with four holes U to receive spacing rods whereby a portion of the base may be offset sufficiently to permit the installation of two or more driven machines, side by side, as shown.

With the above described flexible and extensible mounting for private utilities, I am enabled to assemble all the parts at the shop or factory and mount the machinery for a complete private utility plant thereon making all necessary adjustments at the shop so that all the machines will be properly installed in power transmitting and running relation, to each other and to the driving motor. Then, if the plant be a small one, it may be shipped to the point of use, installed and operated regardless of any ordinary irregularities in the foundation upon which the mounting rests. If the plant be a medium sized one, the machines and mounting may be separately shipped and the castings will fix the points at which the machines will be reassembled with the mounting in running relation. But if the plant be of unusually large size, the mounting may also be shipped in separate sections and connected up at the point of use, the tubular spacing rods being properly marked (or of proper lengths,) to insure a substantial restoration of the initial or shop assembly.

I claim—

1. A mounting for private utilities, comprising a series of rigid base castings, each adapted to be connected with the other castings to form a lineally alined set of units, each of said units being adapted to receive and support a single driving or driven mechanism, and spacing members connecting said bed units in said series, adapted to hold the units and the mechanism supported thereby, in a substantially fixed power transmitting relation to each other, said spacing means being sufficiently flexible to allow each of said units to accommodate itself to the surface upon which it rests.

2. A mounting for private utilities, comprising a series of base castings having flexible spacing connection with each other.

3. A mounting for private utilities, comprising the combination of a lineally alined series of metal units, adapted respectively to support driving and driven mechanisms, and each of said units being adapted to support one of such mechanisms, and a set of spacing rods connecting said units with sufficient flexibility to allow each unit to adjust itself to the surface upon which it rests.

4. A mounting for private utilities including a base member unit having rod receiving sockets therein adapted to facilitate connecting up said member in spaced relation to other similar units, whereby the mounting may be assembled from said unit members.

5. A mounting for private utilities, including a base member, having rod receiving sockets therein adapted to facilitate connecting up said casting in spaced relation to other similar castings, said rod receiving sockets being arranged in sets adapted to provide for connecting up similar castings either in lineal series, or in offset relation, or in parallel series, one lineal and another offset.

6. A mounting for private utilities, comprising a set of castings connected with each other by metallic rods and constituting a base unit for a given machine, in combination with similar base units for other machines, and rods adjustably connecting such units with each other, said rods being adapted to permit the mounting to yield flexibly to a sufficient extent to allow all of said castings to conform to inequalities in the surface of any ordinary foundation floor.

In testimony whereof I affix my signature in the presence of two witnesses.

XENOPHON CAVERNO.

Witnesses:
R. B. GLIDDEN,
A. W. ERRETT, Jr.